(12) United States Patent
Suryanarayanan et al.

(10) Patent No.: US 8,356,015 B1
(45) Date of Patent: Jan. 15, 2013

(54) FILE SYSTEM QUIESCING DRIVER

(75) Inventors: Rangarajan Suryanarayanan, Santa Clara, CA (US); Yogita Bijani, Santa Clara, CA (US); Pashupati Kumar, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 2321 days.

(21) Appl. No.: 10/873,744

(22) Filed: Jun. 21, 2004

Related U.S. Application Data

(60) Provisional application No. 60/542,440, filed on Feb. 5, 2004.

(51) Int. Cl.
*G06F 17/30* (2006.01)

(52) U.S. Cl. ...................................... 707/687

(58) Field of Classification Search ............... 707/1, 687
See application file for complete search history.

(56) References Cited

U.S. PATENT DOCUMENTS 6,647,473 B1 * 11/2003 Golds et al. .................. 711/161

* cited by examiner

*Primary Examiner* — Hosain Alam
*Assistant Examiner* — Johnese Johnson
(74) *Attorney, Agent, or Firm* — Van Pelt, Yi & James LLP

(57) ABSTRACT

A technique for quiescing a file system is described. The technique includes holding a change request, flushing the file system, and releasing the change request. Flushing may include sending a flush request, determining whether a cache associated with the file system is flushed, and in the event that the cache is not flushed, resending the flush request and determining whether the cache is flushed.

3 Claims, 3 Drawing Sheets

FILE SYSTEM QUIESCING DRIVER

CROSS REFERENCE TO RELATED APPLICATIONS

This application claims priority to U.S. Provisional Patent Application No. 60/542,440 entitled FILE SYSTEM QUIESCING DRIVER filed Feb. 5, 2004 which is incorporated herein by reference for all purposes.

FIELD OF THE INVENTION

The present invention relates generally to computer environments. More specifically, a file system quiescing driver is disclosed.

BACKGROUND OF THE INVENTION

Data protection plays an increasingly important role in today's computer systems. Data protection often involves creating regular backups of data. Data may be backed up in various ways, such as by creating a snapshot of a disk. A snapshot, as used herein, includes a backup copy of data as it appeared at a certain point in time. Typically, a portion of disk data is stored in a separate memory associated with the disk, such as in a cache. Before creating a snapshot of a disk, data held in that associated memory is typically flushed to the disk so that a consistent snapshot of the disk can be taken. It would be desirable to have a method for making a disk consistent for file system backup or for other purposes.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
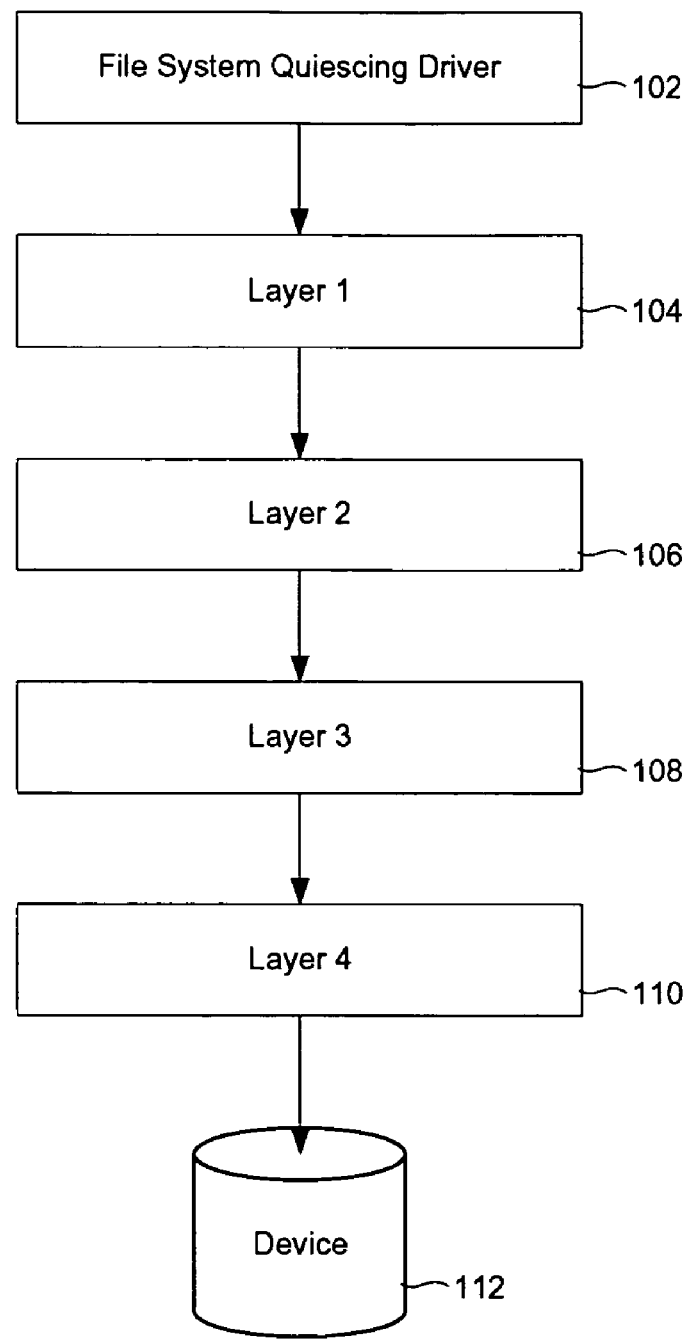
FIG. 1 is a block diagram illustrating one embodiment of a layered device I/O architecture that includes a file system quiescing driver.

FIG. 1 is a block diagram illustrating one embodiment of a layered device I/O architecture that includes a file system quiescing driver. In this example, the layered device I/O architecture includes multiple layers of drivers 102-110 that drive a device 112. I/O requests are received by file system quiescing driver 102 and processed before passing data associated with the request to layer 1. As used herein, quiescing includes any process that makes a disk consistent, such as flushing file system data in a cache to a disk. Quiescing is sometimes referred to as synchronizing ("syncing") file system data in a cache with the disk. At layer 1, processing is performed before passing data to layer 2, and so forth. At each layer, processing may be performed before passing data to the next layer. Processing may include determining that the request should be passed directly to the next layer. For example, some requests may require little or no processing by layer 2, so data may be passed through layer 2 with little or no processing. The processing of the request may be complete without needing to pass through all the layers. For example, the request may be finished being processed at layer 3. Each layer isolates functions from the layer above it, allowing the upper layers to be abstracted from lower layers. Examples of layered device architectures include WINDOWS operating systems, such as WINDOWS NT, WINDOWS 2000, and WINDOWS 2003.

Figure 2:
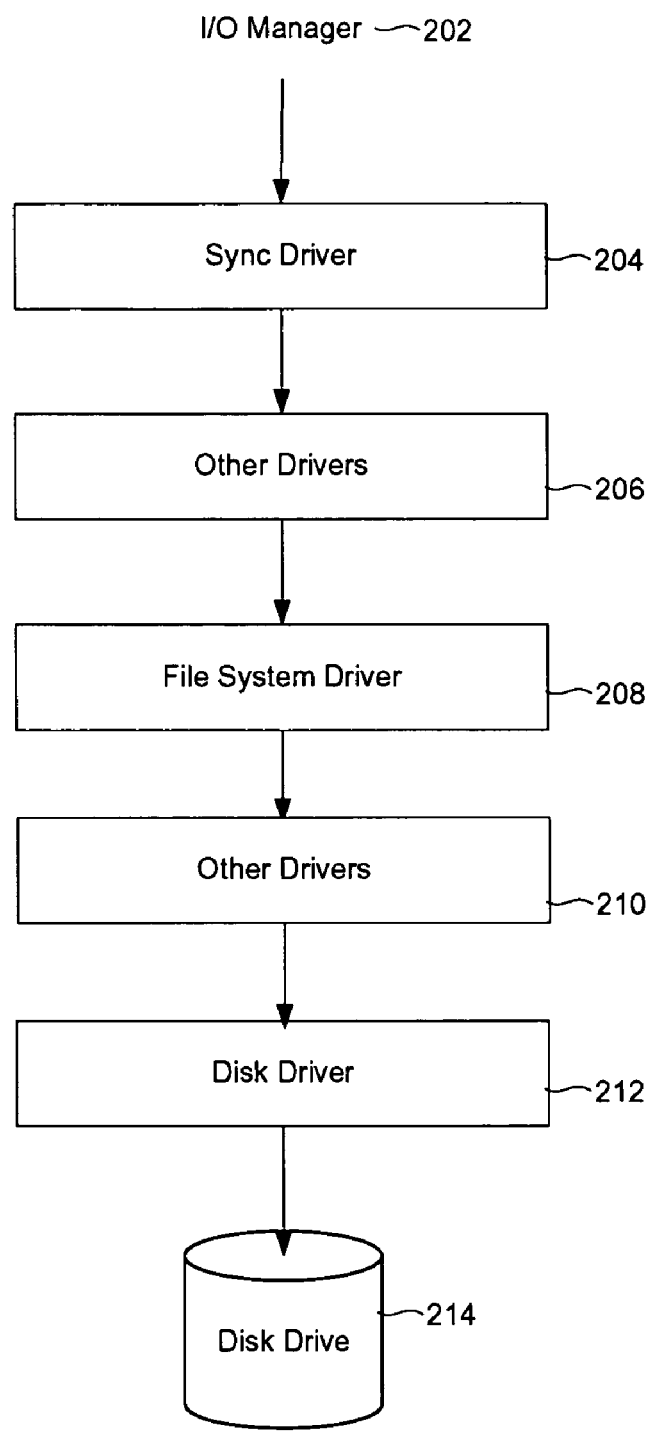
FIG. 2 is a block diagram illustrating one embodiment of a layered device I/O architecture that includes a sync driver.

FIG. 2 is a block diagram illustrating one embodiment of a layered device I/O architecture that includes a sync driver. In this example, I/O manager 202 manages input and output requests. I/O manager 202 passes requests directed to disk drive 214 to sync driver 204. Sync driver 204 is an example of a file system quiescing driver. Sync driver 204 can intercept user mode requests targeted at drive 214 to prevent data from being written to the cache. User mode requests include requests from applications, such as Word or Excel. In some embodiments, sync driver 204 is written according to a WINDOWS specification for filter drivers. File system driver 208 and disk driver 212 are other drivers that may be associated with the driver stack. Other drivers 206 and 210 may include any appropriate drivers, such as a virus driver and a volume manager driver. The driver stack may include any appropriate number of layers.

Figure 3:
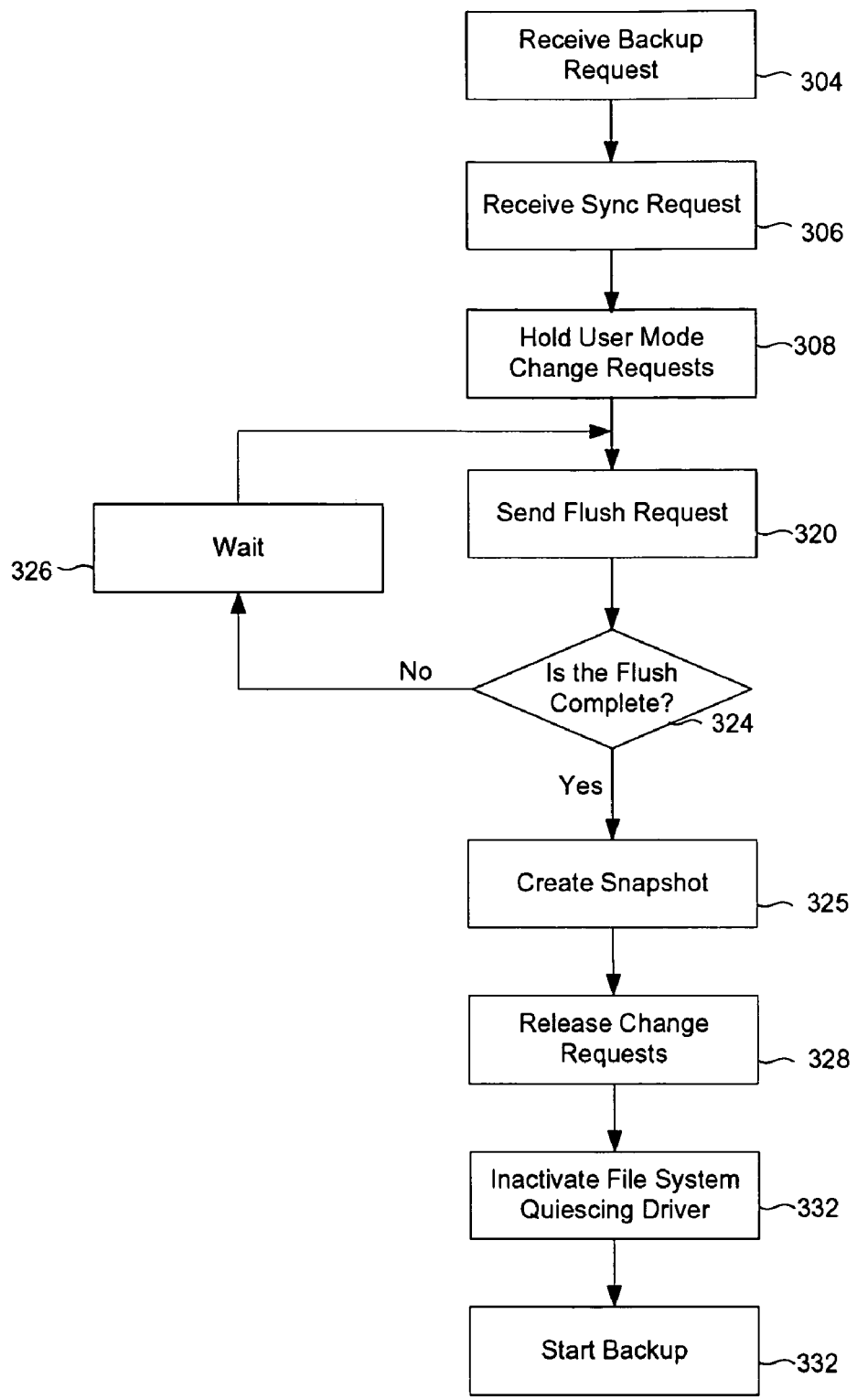
FIG. 3 is a flowchart illustrating a technique used in one embodiment to back up a file system.

FIG. 3 is a flowchart illustrating a technique used in one embodiment to back up a file system. In some embodiments, a file system quiescing driver, such as sync driver 204, handles parts of this process. In this example, a backup request is received (304). For example, a user requests a backup of a hard drive, such as the "E:\" drive. A sync request is received (306). For example, a file system quiescing driver may create a device object for the "E:\" drive, and attach the device object to the top of the drive's stack. All requests for that drive are then routed through the device object in this example. User mode change requests are held (308) to avoid generating new data in the cache while the cache is flushed. A change request, as used herein, includes any request that can alter the disk image of the file system. Examples of change requests include a write request, requests to create a new file, open a new file for writing, rename, move, or delete a file, and change directory permissions associated with a file. The cache is flushed (320-326). Flushing includes, for example, transferring cache data associated with the file system to the disk so that the disk image of the file system is consistent. In some embodiments, flushing the file system is performed as follows.

A flush request is sent (320). For example, the flush request may be sent to the file system driver. For example, in a WINDOWS system, "FlushFileBuffers(Drive)" may be called in one embodiment. The request does not necessarily result in the cache flushing completely to the disk. The request may result in the scheduling of the data in the cache to be flushed. It is then determined whether the flush is complete (324). For example, in a WINDOWS system, "CcIsThereDirtyData(currentIrpStack->FileObject->Vpb)" may be called to determine whether the cache is flushed. If the flush is not complete, there is a wait (324) and the flush request is again made (320). In some embodiments, the flush request is made 50 times every 20 seconds until it is determined that the flush is complete. When the flush is complete, the cache is flushed and the file system image on the disk is consistent.

In some embodiments, kernel mode change requests are held by the file system quiescing driver. Kernel mode requests include requests from the microprocessor, operating system, or other highly privileged systems. A snapshot of the disk is created (325). When the snapshot is complete, user mode and kernel mode change requests that were held are released (328). The file system quiescing driver is optionally inactivated (332). For example, a device object for the drive may be removed. The backup is then started (332). For example, the backup may be created based on the snapshot.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of flushing a file system, comprising:
   sending a flush request;
   determining whether a cache associated with the file system is flushed; and
   in an event that the cache is not flushed:
      resending the flush request;
      determining whether the cache is flushed; and
      in an event that the cache is flushed,
      taking a snapshot associated with the file system.

2. A system for quiescing a file system, comprising:
   a processor configured to:
      send a flush request;
      determine whether a cache associated with the file system is flushed; and
      in an event that the cache is not flushed:
         resend the flush request;
         determine whether the cache is flushed; and
         in an event that the cache is flushed,
         taking a snapshot associated with the file system;
   a memory coupled with the processor, wherein the memory provides the processor with instructions.

3. A computer program product for quiescing a file system, the computer program product being embodied in a computer readable storage medium and comprising computer instructions to:
   send a flush request;
   determine whether a cache associated with the file system is flushed; and
   in an event that the cache is not flushed:
      resend the flush request;
      determine whether the cache is flushed; and
      in an event that the cache is flushed,
      take a snapshot associated with the file system.

* * * * *